US012625678B2

(12) United States Patent
Khankin et al.

(10) Patent No.: US 12,625,678 B2
(45) Date of Patent: May 12, 2026

(54) CORRECTLY ROUNDED TABLE-BASED COMPUTATION OF LOGARITHMIC FUNCTION

(71) Applicant: Next Silicon Ltd, Givatayim (IL)

(72) Inventors: Daniel Khankin, Beer Sheva (IL);
Tomer Levin, New York, NY (US);
Daniel Srebnik, Jerusalem (IL)

(73) Assignee: Next Silicon Ltd, Givatayim (IL)

( * ) Notice: Subject to any disclaimer, the term of this patent is extended or adjusted under 35 U.S.C. 154(b) by 0 days.

(21) Appl. No.: 18/441,119

(22) Filed: Feb. 14, 2024

(65) Prior Publication Data

US 2025/0258649 A1     Aug. 14, 2025

(51) Int. Cl.
*G06F 7/556* (2006.01)

(52) U.S. Cl.
CPC .................................... *G06F 7/556* (2013.01)

(58) Field of Classification Search
CPC .................................... G06F 7/556; G06F 1/03
See application file for complete search history.

(56) References Cited

U.S. PATENT DOCUMENTS

2017/0308357 A1* 10/2017 Bekas ...................... G06F 7/556
2018/0225093 A1* 8/2018 Pillai ................... G06F 7/49915
2024/0094989 A1* 3/2024 Sazegari ................. G06F 7/552

OTHER PUBLICATIONS

Patterson et. al., Computer Organization and Design: The Hardware/Software Interface, 2007 (Year: 2007).*
See also D.A. Patterson et al., Computer Organization and Design, the Hardware/Software Interface, fifth edition, Elsevier, 2014 (Year: 2014).*
D.A. Patterson et al., Computer Organization and Design, the Hardware/Software Interface, fifth edition, Elsevier, 2014 ch 3 (Year: 2014).*
Tang "Table-Driven Implementation of the Logarithm Function in IEEE Floating-Point Arithmetic", ACM Transactions on Mathematical Software, 16(4): 378-400, Dec. 1, 1990.

(Continued)

*Primary Examiner* — Emily E Larocque

(57) ABSTRACT

A method of computing logarithms, comprising receiving a number, computing an exponent and significand of the received number, selecting a breakpoint value from a plurality of breakpoint values segmenting a range of the significand wherein the selected breakpoint value is the significand's greatest lower bound or lowest upper bound, computing a multiplication of the exponent and a logarithm value of two, computing a first intermediate value based on a least significant portion of the significand and an inverse value of the selected breakpoint value, computing an approximated logarithm value of a second intermediate value derived from the first intermediate value, computing a logarithm value of the significand by summing the approximated logarithm value and a logarithm value of the selected breakpoint value, computing a logarithm value of the received number by summing the logarithm value of the significand and the multiplication of the exponent and the logarithm value of two.

19 Claims, 7 Drawing Sheets

(56) References Cited

OTHER PUBLICATIONS

Devor et al. "A Probalistic Model for Rounding Errors: A New Look at the Table-Maker's Dilemma", Proceedings of the 8th International Symposium of Cyber Security, Cryptology, and Machine Learning, CSCML 2024, Be'er Sheva, Israel, Dec. 19-20, 2024, p. 190-200, Dec. 19, 2024.

Khankin et al. "Efficient CORDIAC-Based Shine and Cosine Implementation for A Dataflow Architecture (Extended Abstract)", Cyber Security Cryptography and Machine Learning, Conference Paper, LNCS, 12161: 128-142, Published Online Jun. 25, 2020.

* cited by examiner

CORRECTLY ROUNDED TABLE-BASED COMPUTATION OF LOGARITHMIC FUNCTION

BACKGROUND

The present invention, in some embodiments thereof, relates to computing logarithms for numbers, and, more specifically, but not exclusively, to computing logarithm values for received numbers using precomputed logarithm values of values bounding the significand of the received numbers.

As technology advances, the need for stronger processing systems and computing power rapidly increases. Two common metrics used to measure a processing unit's performance are latency and throughput. As used herein, the term "processing circuit" is used to mean any kind of programmable or non-programmable circuit that is configured to carry out a set of mathematical computation operations such as, for example, computing logarithm values of numbers.

A processing circuit may comprise hardware, firmware, software and/or a combination thereof. For example, a processing circuit may comprise one or more processors and a memory that carries a program which causes the processing circuit to perform operations when the program is executed by the one or more processors.

There exist a variety of methods for improving a processing circuit's performance. Some methods may increase throughput; others may decrease latency. Some methods may both increase throughput and reduce latency, although there is usually a tradeoff between the two metrics.

SUMMARY

It is an object of the present invention to provide methods, systems and software program products for efficiently computing logarithm values of numbers, specifically correctly rounded logarithm values. The foregoing and other objects are achieved by the features of the independent claims. Further implementation forms are apparent from the dependent claims, the description and the figures.

According to a first aspect of the present invention there is provided a method of computing logarithms, comprising using one or more processors configured for:

Receiving a number and computing an exponent and significand of the received number.

Selecting a breakpoint value from a plurality of breakpoint values segmenting a range of the significand, the selected breakpoint value is one of: a greatest lower bound, and a lowest upper bound, of the significand.

Computing a multiplication of the exponent and a logarithm value of two.

Computing a first intermediate value based on a least significant portion of the significand and an inverse value of the selected breakpoint value.

Computing an approximated logarithm value of a second intermediate value derived from the first intermediate value.

Computing a logarithm value of the significand by summing the approximated logarithm value and a logarithm value of the selected breakpoint value.

Computing a logarithm value of the received number by summing the logarithm value of the significand and the multiplication of the exponent and the logarithm value of two.

Outputting the logarithm value computed for the received number.

According to a second aspect of the present invention there is provided a processing apparatus for computing logarithms, comprising an input interface configured to receive a number and compute an exponent and significand of the received number, one or more processors configured to compute a logarithm value of the received number, and an output interface configured to output the logarithm value computed for the received number. The one or more processors configured to compute a logarithm value of the received number by:

Selecting a breakpoint value from a plurality of breakpoint values segmenting a range of the significand. The selected breakpoint value is one of: a greatest lower bound, and a lowest upper bound, of the significand.

Computing a multiplication of the exponent and a logarithm value of two.

Computing a first intermediate value based on a least significant portion of the significand and an inverse value of the selected breakpoint value.

Computing an approximated logarithm value of a second intermediate value derived from the first intermediate value.

Computing a logarithm value of the significand by summing the approximated logarithm value and a logarithm value of the selected breakpoint value.

Computing the logarithm value of the received number by summing the logarithm value of the significand and the multiplication of the exponent and the logarithm value of two.

According to a third aspect of the present invention there is provided a method of computing logarithms, comprising using one or more processors configured for:

Receiving a number and computing an exponent and significand of the received number.

Selecting a breakpoint value from a plurality of breakpoint values segmenting a range of the significand, the selected breakpoint value is one of: a greatest lower bound, and a lowest upper bound, of the significand.

Computing a first intermediate value based on a least significant portion of the significand and an inverse value of the selected breakpoint value.

Computing an approximated binary logarithm value of a second intermediate value derived from the first intermediate value.

Computing a binary logarithm value of the significand by summing the approximated binary logarithm value and a binary logarithm value of the selected breakpoint value.

Computing a binary logarithm value of the received number by summing the binary logarithm value of the significand and the exponent.

Computing a base b logarithm value of the received number by dividing the binary logarithm value of the received number by a binary logarithm value of b.

Outputting the logarithm value computed for the received number.

In a further implementation form of the first, second and/or third aspects, the received number is selected from a group consisting of: floating-point, integer, fixed-point, Unum, posit, and logarithmic number system (LNS).

In a further implementation form of the first, second and/or third aspects, the one or more processors are configured to compute at least some of the computation using one or more arithmetic circuits employing unsigned integer arithmetic.

In a further implementation form of the first, second and/or third aspects, the logarithm value of the received number is computed according to the formulation:

$$\log_b(x) = e \log_b(2) + \log_b(m)$$

wherein x is the received number, e is the exponent of the number, m is the significand of the received number, and b is a selected base of the logarithm. In a further implementation form of the first, second and/or third aspects, the logarithm value of the significand is computed according to the formulation:

$$\log_b(m) = \log_b(c_k) + \log_b(1 + r)$$

wherein $c_k$ represents the selected breakpoint value, and r is the first intermediate value.

In a further implementation form of the first, second and/or third aspects, each of a plurality of breakpoint values $c_k$ is computed according to the formulation:

$$c_k = 1 + \frac{k}{2^N}$$

wherein N is a parameter determining a number of breakpoints, and k is an index of a respective breakpoint,
wherein $k=(0, 1, 2, \ldots, 2^N-1)$ for selecting a breakpoint value which is a greatest lower bound of the significand, and
wherein $k=(1, 2, \ldots, 2^N)$ for selecting a breakpoint value which is a lowest upper bound of the significand.

In a further implementation form of the first, second and/or third aspects, the first intermediate value is computed according to the formulation:

$$r = \frac{1}{c_k}(m - c_k).$$

In a further implementation form of the first, second and/or third aspects, the approximated logarithm value of the second intermediate value is computed according to the formulation:

$$\log_b(1+r).$$

In a further implementation form of the first, second and/or third aspects, the inverse value and the logarithm value of the selected breakpoint value are precomputed and fetched from memory.

In a further implementation form of the first, second and/or third aspects, the inverse value and/or the logarithm value of the selected breakpoint value are stored in the memory in fixed-point format.

In a further implementation form of the first, second and/or third aspects, the inverse value and/or the logarithm value of the selected breakpoint value are computed in runtime.

In an optional implementation form of the first, second and/or third aspects, a number of the plurality of breakpoint values segmenting the range of the significand is adjusted according to the value of the received number and selecting the selected breakpoint value accordingly.

In an optional implementation form of the first, second and/or third aspects, a the logarithm value of the received number is computed in one or more additional iterations. Each additional iteration comprises adjusting a number of breakpoint values segmenting the range of the significand according to the logarithm value computed for the received number in a previous iteration, selecting another breakpoint value based on the adjusted number of breakpoint values, and computing the logarithm value of the received number based on the another selected breakpoint value.

In a further implementation form of the first, second and/or third aspects, the one or more processors comprise one or more unsigned integer arithmetic circuits configured to compute one or more of the first intermediate value, the approximated logarithm value, the logarithm value of the significand, and/or the logarithm value of the received number based on the inverse value and the logarithm value of the selected breakpoint value which are expressed in fixed-point format.

In an optional implementation form of the first, second and/or third aspects, the logarithm value of the received number is rounded according to one or more rounding schemes.

In a further implementation form of the first, second and/or third aspects, the approximated logarithm value of the second intermediate value is computed by applying minimax polynomial approximation.

In a further implementation form of the first, second and/or third aspects, the one or more processors comprise one or more interconnected computing grids comprising one or more interconnect networks, a plurality of configurable data routing junctions, and a plurality of reconfigurable logical elements connectable by the plurality of configurable data routing junctions and the one or more interconnect networks.

In an optional implementation form of the first, second and/or third aspects, the one or more processors are further adapted to collect a plurality of statistical values comprising a plurality of data-statistic values indicative of the computing of the first intermediate value, the approximated logarithm value, the logarithm value of the significand, and/or the logarithm value of the received number, and analyze the plurality of statistical values to evaluate hardware utilization.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL
VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

DETAILED DESCRIPTION

Figure 1:
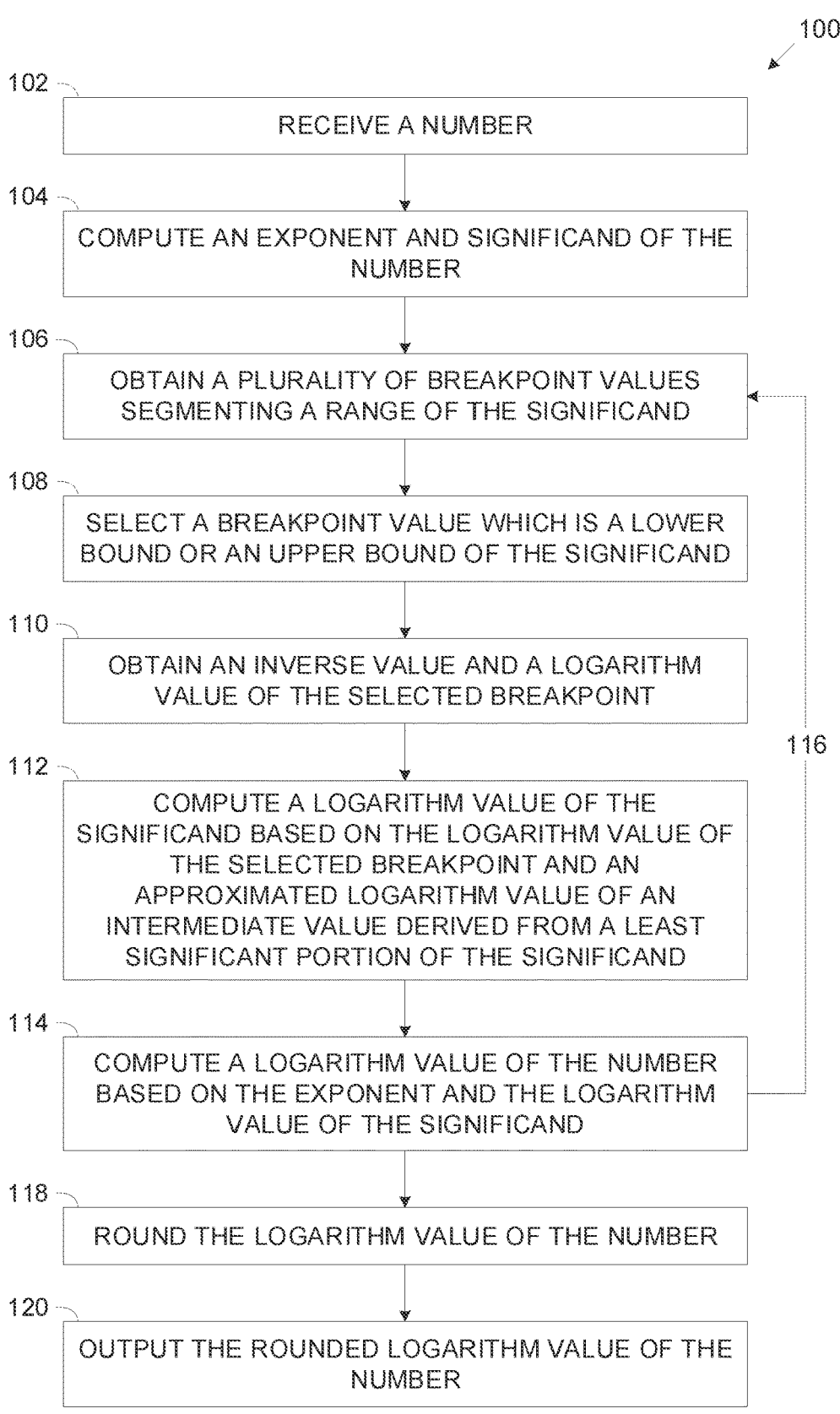
FIG. 1 is a flowchart of an exemplary process of computing a logarithm of a number, according to some embodiments of the present invention.

The present invention, in some embodiments thereof, relates to computing logarithms for numbers, and, more specifically, but not exclusively, to computing logarithm values for received numbers using precomputed logarithm values of values bounding the significand of the received numbers.

According to some embodiments of the present invention, there are provided apparatuses, methods and computer program products for computing logarithm values of one or more numbers, for example, a floating-point number, an integer number, a fixed-point number, a Logarithmic Number System (LNS) number, and/or the like.

Each received number may be converted to a common representation, for example, fixed-point, unsigned integer, and/or the like for which a logarithm value may be computed.

As known in the art, in processor based computing, the logarithm value of a number may be computed by aggregating the logarithm value of the significand of the number and a multiplication of the exponent of the number with a logarithm value of two. Other similar formulations in which the same concept is applied with some variation may apply. While the computation of the multiplication of the exponent and the logarithm value of two may be a fast, straightforward operation which may require little time and computing resources, computing the logarithm value of the significand may be a resource and/or time intensive operation.

According to embodiments of the present invention, the logarithm value of the significand of each received number may be computed based on a logarithm value of a value which bounds the significand of the received number, from the bottom or from the top, and an approximated logarithm of an intermediate value derived from a difference between the significand of the received number and the bounding value (number). This is based on the notion that the logarithm value of the significand of the number may be computed by aggregating the logarithm value of the bounding value which may express the most significant portion of the significand and the approximated logarithm value of the intermediate value which is based on the least significant portion of the significand.

The bounding value may be selected from a plurality of breakpoint values segmenting a range of the significand, for example, a range between 1 and 2, [1,2), for normalized numbers, a range between 0 and 1, (0,1), for denormal numbers, and/or the like. Optionally, the significand of the received number is first normalized to the range of [1,2) before processed to compute its logarithm value.

According to some embodiments, the bounding breakpoint value may be a lower bound of the significand of the received number and the selected breakpoint value may be thus the breakpoint value which is the greatest lower bound of the significand among the plurality of breakpoint values.

According to other embodiments, the bounding breakpoint value may be an upper bound of the significand of the received number and the selected breakpoint value may be thus the breakpoint value which is the lowest upper bound of the significand among the plurality of breakpoint values.

Logarithm values may be computed for the plurality of breakpoint values, typically precomputed in advance and/or computed off-line and stored in memory. As such the logarithm value of the selected bounding breakpoint value does not need to be computed in runtime (real-time) but may be rather fetched from memory, in particular a high-speed, low-latency access memory.

The logarithm value of the intermediate value derived from the least significant portion of the significand may be computed using one or more methods, functions, and/or algorithms, for example, polynomial-based approximation, and/or the like. Moreover, the intermediate value itself may be computed based on an inverse value of the selected bounding breakpoint which may be also precomputed in advance and/or computed off-line and stored in memory.

The logarithm value of the significand may be then computed by aggregating the logarithm value of the bounding breakpoint value, i.e., the logarithm value of the most significant portion of the significand, which may be fetched from memory, and the approximated logarithm value of the intermediate value derived from the difference between the significand of the received number and the bounding breakpoint value, i.e., the least significant portion of the significand.

After computing the logarithm value of the significand, the logarithm value of the received number may be computed by aggregating the logarithm value of the significand and a multiplication of the exponent and the logarithm value of two.

The logarithm value, computed for the received number, may be converted to a format defined for the output logarithm value of each received number, for example, floating-point, integer, fixed-point, Unum, posit, LNS, and/or the like and may be further rounded using one or more methods to produce a correctly rounded logarithm value for the received number.

Computing correctly rounded logarithm values for numbers using precomputed values of breakpoint values which bound the significand of the numbers may present major benefits and advantages over currently existing methods and systems for computing logarithm values.

First, fetching the precomputed logarithm value of the selected breakpoint value from memory and computing the intermediate value based on the precomputed inverse value of the selected breakpoint value may be extremely fast and may thus significantly reduce computing time of logarithm value compared to runtime (real-time) computation of the logarithm value of the received number.

Moreover, fetching the precomputed logarithm value and the precomputed inverse value of the selected breakpoint value from memory rather than computing them in runtime may significantly reduce computing resources thus reducing hardware resource utilization, power consumption, and/or the like.

Furthermore, since the intermediate value derived from the least significant portion of the significand of the received number is mapped in a significantly reduced interval compared to the entire significand, the computation of the logarithm value of the intermediate value may be significantly simpler and consume significantly less computing resources compared to computation of the logarithm value of the entire significand as may be done by the existing methods.

Also, since the approximated logarithm value is computed for the intermediate value which is mapped in the significantly reduced interval, accuracy of the approximated logarithm value of the intermediate value may be significantly greater than the accuracy of an approximated logarithm value computed for the entire significand of the received number as may be done by existing methods.

Finally, any format of input numbers (i.e., floating-point, fixed-point, integer, etc.) may be received for computing its logarithm value and any output format may be supported for the output logarithm value since each received number may be converted to a common representation for computing its logarithm value and the resulting logarithm value may be converted to the format defined for the output logarithm value.

Since the approximated logarithm value may be converted from a common representation, the computed approximated logarithm value may be losslessly adhered to other computations.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring to the drawings, FIG. 1 is a flowchart of an exemplary process of computing a logarithm of a number, according to some embodiments of the present invention.

An exemplary process 100 may be executed to compute logarithm values of one or more numbers, for example, a floating-point number, an integer number, a fixed-point number, a Logarithmic Number System (LNS) number, and/or the like.

In particular, the process 100 may be executed to compute the logarithm of a received number based on a logarithm value of a value which bounds the significand of the received number from the bottom or from the top and an approximated logarithm of an intermediate value derived from the difference between the significand of the received number and the bounding value (number).

The bounding value may be selected from a plurality of breakpoint values segmenting a range of the significand, for example, a range between 1 and 2 for normalized numbers, a range between 0 and 1 for denormal numbers, and/or the like. Optionally, denormal numbers may be normalized to have their significand in the range of [1,2) before the number is further processed to compute their logarithm value.

The bounding breakpoint value may be a lower bound of the significand of the received number and the selected breakpoint value may be thus the breakpoint value which is the greatest lower bound of the significand among the plurality of breakpoint values. Alternatively, the bounding breakpoint value may be an upper bound of the significand of the received number and the selected breakpoint value may be thus the breakpoint value which is the lowest upper bound of the significand among the plurality of breakpoint values.

According to some embodiments of the present invention, the decision whether to use the greatest lower bound or the lowest upper bound may be made in advance, before the number has been received, or after the number has been received.

A logarithm value may be computed for each of the breakpoint values, optionally in advance and/or off-line and may be therefore fetched from memory thus significantly reducing computing resources, for example, processing resources, memory resources, processing time, power consumption and/or the like.

The intermediate value derived from the difference between the significand of the received number and the roughly bounding number, which is in practice the least significant portion of the significand of the received number, may be computed using a precomputed inverse value of the selected bounding value. The approximated logarithm value of the derived intermediate value may be then computed using one or more methods, functions, and/or algorithms, for example, polynomial-based approximation, and/or the like.

The logarithm value of the significand of the received number may be therefore computed by aggregating the logarithm value of the bounding breakpoint value, i.e., the logarithm value of the most significant portion of the significand, which may be fetched from memory, and the approximated logarithm value of the intermediate value derived from the least significant portion of the significand.

Since the approximated logarithm value is computed for the intermediate value, which is mapped and bound to a limited interval which is significantly smaller than the entire significand, the computation may be significantly simpler and less computing resource consuming compared to computation of the logarithm value of the entire significand as may be done by the existing methods. Moreover, accuracy and/or precision of the approximated logarithm value of the intermediate value may be significantly increased compared to an approximated logarithm value computed for the entire significand.

Figure 2:
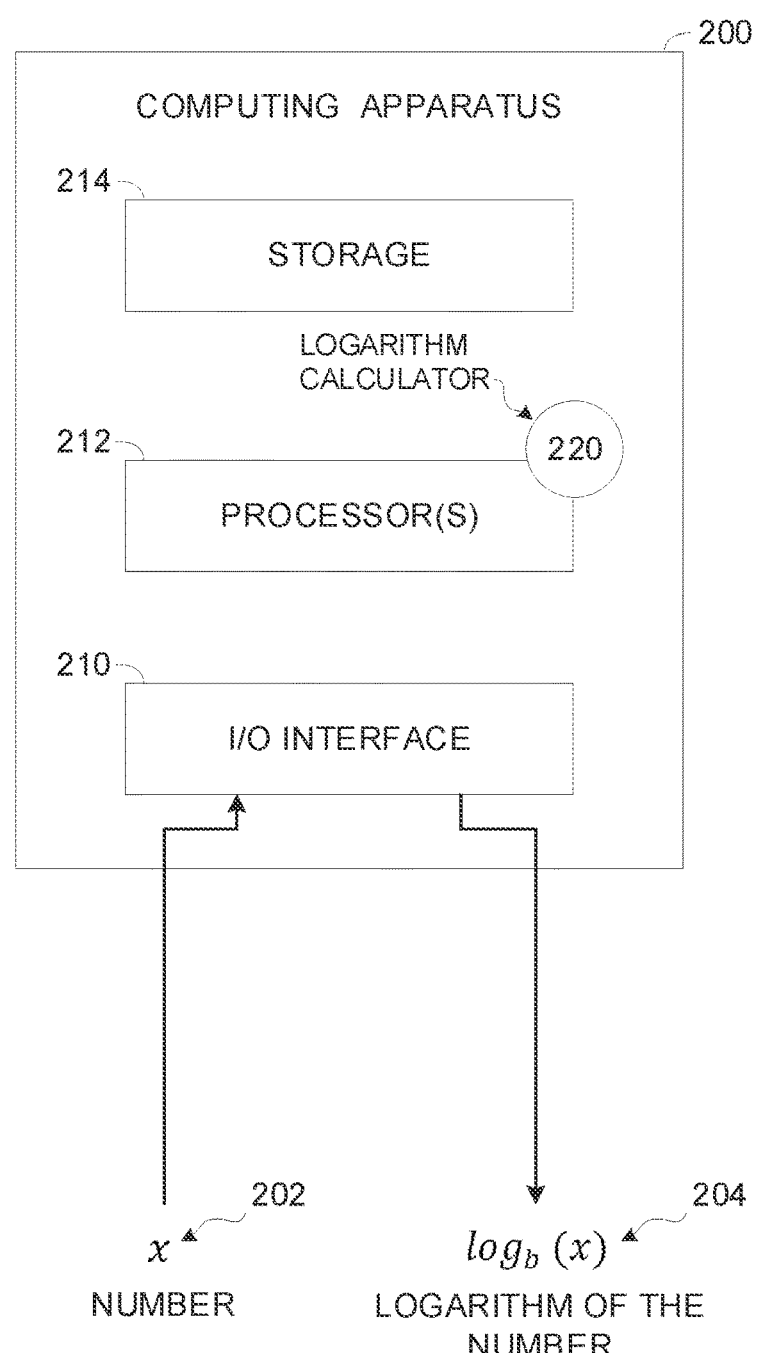
FIG. 2 is a schematic illustration of an exemplary processing apparatus for computing a logarithm of a number, according to some embodiments of the present invention.

Reference is also made to FIG. 2, which is a schematic illustration of an exemplary processing apparatus which may be used for computing a logarithm of a number, according to some embodiments of the present invention.

An exemplary processing apparatus 200 may be adapted to receive one or more numbers 202, interchangeably designated x, hereinafter having one or more formats, for example, floating-point, integer, a fixed-point, LNS, and/or the like and compute a logarithm value 204, interchangeably designated $\log_b(x)$, for the received number 202 in a selected base b, for example, binary logarithm ($\log_2(x)$), base 10 logarithm, ($\log_{10}(x)$), natural logarithm ($\ln(x)$), and/or the like.

The processing apparatus 200 may include an Input/Output (I/O) interface 210 for receiving numbers x 202 and outputting their computed logarithm values log b(x) 204, a processor(s) 212 for executing the process 100, and a storage 214 for storing data and/or computer program code (program store).

The processing apparatus 200 may be implemented according to one or more architectures, structures and/or configurations. For example, the processing apparatus 200 may be implemented as a stand-alone apparatus, system, device and/or the like which may execute the process 100 independently of other circuits, devices, and/or the like. In another example, the processing apparatus 200 may be integrated in one or more higher level integrated devices. For example, the processing apparatus 200 may be implemented as an Integrated Circuit (IC), Application-Specific Integrated Circuit (ASIC), Field Programmable Gate Array (FPGA), and/or the like in one or more devices, for example, a computer, a server, a computing device, and/or the like which may optionally comprise one or more additional elements. In another example, the processing apparatus 200 may be integrated in one or more higher level integrated circuits. For example, the processing apparatus 200 may be implemented as a functional module (e.g., IP core, etc.) embedded in one or more integrated components (e.g., IC, ASIC, FPGA, CPU, etc.) comprising one or more additional functional elements of the integrated component.

The I/O interface 210 may include one or more wired and/or wireless I/O interfaces, ports and/or interconnections designed, adapted and/or deployed to receive and/or output data, specifically, receive numbers x 202 and/or output their logarithm values log b(x). The I/O interface 210 may be adapted according to the deployment, architecture, and/or structure of the processing apparatus 200.

For example, assuming the processing apparatus 200 is a stand-alone device, the I/O interface 210 may comprise one or more ports, for example, a Universal Serial Bus (USB) port, a serial port, a Bluetooth (BT) interface, a Radio Frequency (RF) interface, and/or the like for connecting to one or more external and/or attachable devices, for example, an attachable storage media (e.g., memory stick, etc.), a nearby device (e.g., mobile device, etc.), and/or the like. In another example, the I/O interface 210 may include one or more wired and/or wireless network interfaces for connecting one or more wired and/or wireless networks, for example, a Local Area Network (LAN), a Wireless LAN (WLAN, e.g. Wi-Fi), a Wide Area Network (WAN), a Metropolitan Area Network (MAN), a cellular network, the internet and/or the like for connecting to one or more remote resources connected to the network, for example, a server, a cloud service, a storage server, and/or the like.

In another example, assuming the processing apparatus 200 is integrated in a higher level integrated device, the I/O interface 210 may comprise one or more interconnections, for example, copper traces of a Printed Circuit Board (PCB), such as a bus, a switch fabric, point to point channels, and/or the like through which the processing apparatus 200 may communicate with one or more other components, (e.g., IC, ASIC, FPGA, CPU, GPU, etc.) of the integrated device to receive and/or transmit data.

In another example, assuming the processing apparatus 200 is embedded in an integrated component, the I/O interface 210 may be implemented via interconnects in the material and/or substrate constituting the integrated component (e.g., Silicon) through which the processing apparatus 200 may connect to one or more other functional elements and/or modules embedded in the integrated component for receiving and/or transmitting data.

Moreover, the processing apparatus 200 may be electrically coupled and connected to one or more of other processing circuits via one or more digital interconnections and/or networks deployed in the processing apparatus 200. Such interconnections may include, for example, a Compute Express Link (CXL) interconnect, a Gen-Z cache coherent interconnect for accelerators (CCIX), a Coherent Accelerator Processor Interface (CAPI), a Peripheral Component Interconnect Express (PCI-e) and/or the like.

The processor(s) 212, homogeneous or heterogeneous, may include one or more processing nodes arranged for parallel processing, as clusters and/or as one or more multi-core processor(S). The processors 212 may employ one or more processor architectures, structures and/or instruction sets and/or the like. For example, the processor(s) 212 may comprise one or more processors employing a von Neumann architecture, for example, a Central Processing Unit (CPU), a multi-core CPU, a Data Processing Unit (DPU), a Micro-controller Unit (MCU) an Accelerated Processing Unit (ACU) and/or the like. In another example, the processor(s) 212 may comprise one or more processors employing a non-von Neumann architecture, for example, a Graphical Processing Unit (GPU), a DPU, a Field-Programmable Gate Array (FPGA), a Coarse-Grained Reconfigurable Architecture (CGRA), a neural-network accelerator, an Intelligence Processing Unit (IPU), an Application-Specific Integrated Circuit (ASIC), a quantum computer, an interconnected computing grid and/or the like.

The processor(s) 212 may comprise one or more arithmetic circuits adapted, as known in the art, to perform mathematical operations such as, for example, addition, subtraction, multiplication, and division, and further execute instructions involving mathematical calculations.

Optionally, one or more of the arithmetic circuits are fixed-point units configured to perform mathematical operations on fixed-point operands, i.e., operands represented in fixed-point format.

Moreover, the processor(s) 212 may comprise a plurality of arithmetic circuits which may be adapted to execute independently, jointly, and/or simultaneously to expedite computation.

The storage 214 may include one or more non-transitory memory devices, either persistent non-volatile devices, for example, a ROM, a Non-Volatile RAM (NVRAM), a Flash array, a hard drive, a Solid State Drive (SSD), and/or the like. The storage 214 may also include one or more volatile devices, for example, a RAM device, a cache memory, a Lookup Table (LUT), and/or the like.

Optionally, in a stand-alone processing apparatus 200 having network connectivity, the storage 214 may further comprise one or more local and/or remote network storage resources, for example, a storage server, a Network Attached Storage (NAS), a network drive, a cloud storage service and/or the like accessible via the network.

The storage 214 may store, for example, received data, computation products, computation partial products, program code, constraints, rules, and/or the like received, used and/or generated by the I/O interface 210, the processor(s) 212, and/or the like. The storage 214 may further store data which may be output from the processing apparatus 200 via the I/O interface 210.

The processor(s) 212 may execute one or more software modules, for example, a process, a script, an application, an agent, a utility, a tool, an Operating System (OS), a service, a plug-in, an add-on and/or the like, each comprising a plurality of program instructions stored in a non-transitory medium (program store) such as the storage 214 and executed by one or more processors such as the processor(s) 212.

Optionally, the processor(s) 212 may include, utilize and/or apply one or more hardware elements available in the code generation system 200, for example, a circuit, a component, an Integrated Circuit (IC), an ASIC, a Field Programmable Gate Array (FPGA), a Digital Signals Processor (DSP), a Graphic Processing Unit (GPU), an Artificial Intelligence (AI) accelerator, a network processor, and/or the like.

The processor(s) 212 may therefore execute one or more functional modules utilized by one or more software modules, one or more of the hardware elements and/or a combination thereof. For example, the processor(s) 212 may execute a logarithm calculator 220 configured to execute the process 100 and its derived processes 400, 450 and/or 500 and/or part thereof for computing a logarithm value log b(x) 204 for one or more received numbers x 202.

It should be noted that each of one or more processors of the processing apparatus 200 may execute the process 100 and/or part thereof. However, it is possible that one or more of the processors of the processing apparatus 200 may not participate in the execution of the process 100.

Optionally, the processing apparatus 200, specifically, the logarithm calculator 220 may be executed, implemented and/or utilized by one or more cloud computing services, platforms and/or infrastructures such as, for example, Infrastructure as a Service (IaaS), Platform as a Service (PaaS), Software as a Service (SaaS) and/or the like provided by one or more vendors, for example, Google Cloud, Microsoft Azure, Amazon Web Service (AWS) and Elastic Compute Cloud (EC2), IBM Cloud, and/or the like.

According to some embodiments, the processing apparatus 200 may comprise one or more processing circuits each constructed of one or more interconnected computing grids. Each interconnected computing grid may comprise a plurality of reconfigurable logical elements and memory units connected by a plurality of configurable data routing junctions. The interconnected computing grid may therefore dynamically change and adapt in runtime to connect between the reconfigurable processing resources and/or memory units to create a compute graph optimized for efficient execution of the computation task (e.g., compute kernel, algorithm, program, etc.) currently executed using the interconnected computing grid.

The compute graph may be a directed acyclic graph constructed of a plurality of nodes connected by edges in which the nodes correspond to operations of the computation task and the edges correspond to data movement between the operations. The compute graph of the computation task may be therefore projected on interconnected computing grid(s) of the processing apparatus 200 by mapping the nodes (operations) of the compute graph of the computation task to the reconfigurable logic elements and configuring the configurable data routing junctions to connect the nodes according to the edges of the compute graph.

This means that in runtime, during execution of each specific computation task, the computation task may be analyzed to determine its requirements and the interconnected computing grid may be adjusted and/or adapted accordingly to optimize execution of the respective computation task, for example, reduce the size of the compute graph utilizing the computation task, reducing computation complexity, reducing computation latency (time), reducing hardware utilization of the processing apparatus 200, reducing power consumption, and/or the like.

Figure 3:
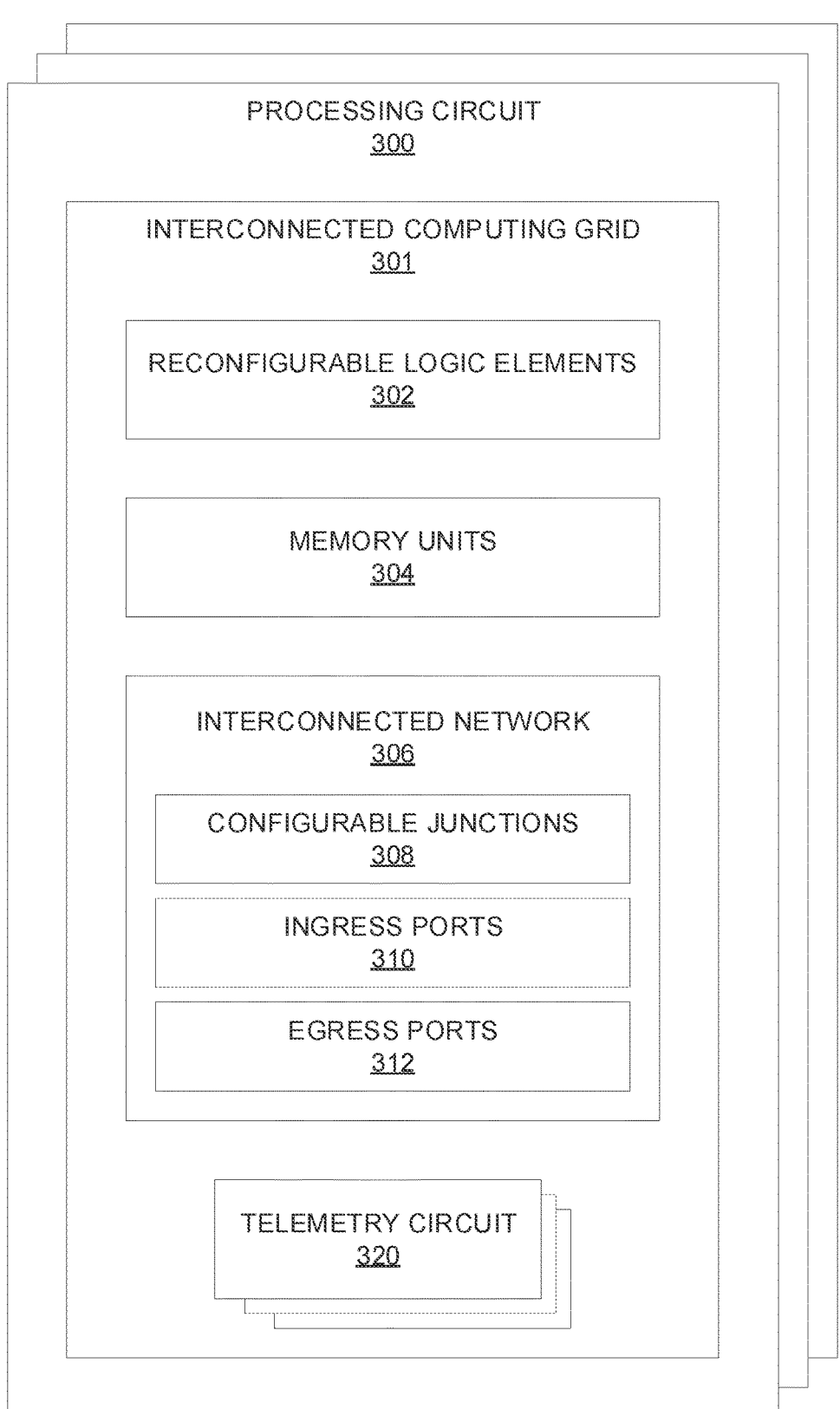
FIG. 3 is a schematic illustration of an exemplary processing circuit comprising an interconnected computing grid applied to compute a logarithm of a number, according to some embodiments of the present invention.

Reference is now made to FIG. 3, which is a schematic illustration of an exemplary processing circuit 300 comprising an interconnected computing grid 301 applied to compute a logarithm of a number, according to some embodiments of the present invention.

A processing apparatus such as the processing apparatus 200 may include one or more processing circuits 300 each comprising an interconnected computing grid 301 comprising a plurality of reconfigurable logical elements 302 and a plurality of memory units 304 connectable via an interconnected network 306.

The interconnected network 306 may comprise a plurality of configurable data routing junctions 308, plurality of ingress ports 310 and a plurality of egress ports 312 which may be configured to connect between one or more of the reconfigurable logical elements 302 and/or one or more of the memory units 304.

The configurable data routing junctions 308 may be dynamically reconfigured to connect between one or more of the reconfigurable logical elements 302 and one or more other reconfigurable logical elements 302 and/or one or more of the memory units 304. Moreover, one or more of the ingress ports 310 and/or the egress ports 312 may be connected via the configurable data routing junctions 308 to further connect between one or more of the reconfigurable logical elements 302 and/or one or more of the memory units 304.

For example, a set of reconfigurable logical elements 302 may be interconnected via one or more configurable data routing junctions 308, and optionally additionally via one or more ingress ports 310 and/or egress ports 312. In another example, serval reconfigurable logical elements 302 may be interconnected to each other and further connected to one or more memory units 304 via one or more configurable data routing junctions 308, and optionally additionally via one or more ingress ports 310 and/or egress ports 312.

The processing circuit 300, specifically the interconnected computing grid 301 may optionally include hardware, for example, one or more telemetry circuitries 320, optionally for the purpose of collecting, capturing, recording and/or storing one or more statistical values, optionally while the processing circuit 300 executes one or more computational tasks, specifically, compute logarithm values and/or compute instructions.

The statistical values may include, for example, one or more data-statistic values relating to the data processed using the processing circuit 300. In another example, the statistical values may include one or more statistical values relating to the compute graph executed using the processing circuit 300, for example, one or more statistical values regarding the logarithm value, the breakpoint values, the approximated logarithm value, and/or the like. In another example, the statistical values may include one or more statistical values relating to the computation task executed using the processing circuit 300, for example, one or more process iteration statistical values.

Optionally, the telemetry circuitry(s) 320 may further comprise one or more counters and/or one or more memory areas for collecting historical values of at least some of the data, the compute graph and/or the process executed using the processing circuit 300. For example, the historical values may include one or more breakpoint values used for bounding the received number 202 selected during previous iterations and/or one or more previous computation tasks. The historical values may further include one or more data variables, for example, a RISC-V processor counter, a high bandwidth memory controller counter, and a memory channel counter.

Reference is made once again to FIG. 1.

For brevity, the process 100 is described for computing the logarithm value of a single received number. This of course should not be construed as limiting since the process 100 may be repeated, expanded and/or scaled for computing the logarithm values of a plurality of received numbers.

As described hereinabove, the processing apparatus 200 may implement one or more software modules, one or more hardware modules, and/or a combination thereof for executing the process 100.

As shown at 102, the process 100 starts with receiving, for example, by the logarithm calculator 220 via the I/O interface 210, a number 202 for computing its logarithm value 204. The number 202 may be received in one or more formats used in computing environments, for example, floating-point, integer, fixed-point, Unum, posit, Logarithmic Number System (LNS), and/or the like.

As shown at 104, the process may continue with computing a significand m, and an exponent e of the received number 202, for example, by the logarithm calculator 220.

Moreover, the process may include determining whether the received number 202 is negative or positive, for example, by the logarithm calculator 220. In case the received number 202 is positive, the process may proceed to computing the logarithm value of the number 202. However, in case the received number 202 is negative, one or more actions may be initiated, for example, an exception, an interrupt, a system call, and/or the like indicating that a logarithm value cannot be computed for the received number 202, for example, return a Not a Number (NaN) result for the received number.

The process may further include computing and/or determining, for example, by the logarithm calculator 220, the sign S of the logarithm value computed for the received number x 202. i.e., the outcome (output) of the computation, based on the received number x 202, specifically, the sign S may be positive if the received number x 202 is larger than 1 or it may be negative if the received number x 202 is in the range between 0 and 1.

Computing the significand, and the exponent of the number 202 may depend on its format. For example, in case of a floating-point number 202, the significand, and exponent may be simply extracted and/or derived from the received number 202. In another example, in case of an integer or fixed-point number 202, the significand, and exponent may be computed by converting the number 202 to floating-point format, as known in the art.

The significand represents the precision bits of a number, in this case the received number 202. The significand is stored in normalized form, which means the radix point is put after the first non-zero digit. Since in base 2 the only possible non-zero digit is one, the minimal value of the significand is 1. The value of the significand is smaller than the base. Therefore, the range of values of the significand is greater than or equal to 1, and smaller than 2, i.e., $1 \leq m < 2$.

However, the range of the significand of subnormal (denormal) floating-point numbers is between 0 and 1, i.e., $0 < m < 1$. Subnormal numbers may be used, as known in the art, to represent very small, non-zero values that are smaller than the smallest normalized value representable in a given floating point format.

For brevity, the process 100 is described hereinafter for normalized floating-point numbers. However, the same process 100 may be applied to subnormal floating-point numbers with minor modifications which may become apparent to a person skilled in the art. Optionally, the received number may be first normalized to have its significand in the range of [1,2) before it is further processed to compute its logarithm value.

As shown at 106, the process continues with obtaining, for example, by the logarithm calculator 220, a distribution of a plurality of breakpoint values segmenting a range of the significand according to one or more parameters. In other words the range of the significand may be segmented to a plurality of equal intervals by the plurality of breakpoint values which number may be determined by a parameter N.

For example, each of the plurality of breakpoint values, designated $c_k$, may be computed according to equation (formulation) 1 below.

$$c_k = 1 + \frac{k}{2^N} \qquad \text{Equation 1}$$

wherein $k=(0, 1,2, \ldots, 2^N-1)$ or $k=(1,2, \ldots, 2^N)$ as described hereinafter.

As seen, the number of breakpoint values $c_k$ is defined by the value of the parameter N. For example, for N=3, the number of breakpoints may be 8. In another example, for N=5, the number of breakpoints may be 32.

It should be noted that while equation 1 is directed to normalized floating-point numbers, it may be adjusted for processing subnormal floating-point numbers, for example, according to equation 2 below.

$$c_k = \frac{k}{2^N} \qquad \text{Equation 2}$$

with $k=(0, 1,2, \ldots, 2^N-1)$ or $k=(1,2, \ldots, 2^N)$ as before.

As stated hereinbefore, optionally, a subnormal floating-point number may be first normalized to have its significand in the range of [1,2).

As shown at 108, the process continues with selecting one of the plurality of breakpoints $c_k$ which bounds the significand of the number 202, for example, by the logarithm calculator 220.

In particular, a breakpoint value $c_k$ which bounds the significand, i.e., N most significant bits (MSB) out of n bits of the significand such that (p–N) is the number of Least Significant Bits (LSB) of the significand, may be selected, for example, by the logarithm calculator 220.

According to some embodiments, a breakpoint value $c_k$ which is a greatest lower bound of the significand among the plurality of breakpoint values $c_k$ may be selected, for example, by the logarithm calculator 220. In such case, the distribution of the breakpoint values $c_k$ may be defined by $k=(0, 1, 2, \ldots, 2^N-1)$ according to equation 1. For example, assuming N=3, the number of breakpoint values $c_k$ is 8, distributed at 1.000, 1.125, 1.250, 1.375. 1.500, 1.625, 1.750, and 1.875. Further assuming the value of the significand is 1.40625, the breakpoint value $c_4=1.375$ which is the greatest lower bound of 1.40625 among the eight breakpoint values $c_k$ may be selected, for example, by the logarithm calculator 220.

According to some embodiments, a breakpoint value $c_k$ which is a lowest upper bound of the significand among the plurality of breakpoint values $c_k$ may be selected, for example, by the logarithm calculator 220. In such case, the distribution of the breakpoint values $c_k$ may be defined by $k=(1,2, \ldots, 2^N)$ according to equation 1. For example, assuming N=3, the number of breakpoint values $c_k$ is 8, distributed at 1.125, 1.250, 1.375. 1.500, 1.625, 1.750, 1.875 and 2.000. Further assuming the value of the significand is 1.515625, the breakpoint value $c_5=1.625$ which is the lowest upper bound of 1.515625 among the eight breakpoint values $c_k$ may be selected, for example, by the logarithm calculator 220.

According to some embodiments, the decision whether to select the greatest lower bound or the lowest upper bound may be taken in advance, before the number x 202 has been received or according to the received number x 202.

Optionally, distribution of the breakpoint values $c_k$, i.e., the number of breakpoint values $c_k$ may be adjusted according to the value of the received number 202, specifically according to the significand computed for the received number 202, and more specifically according to the most significant portion of the significand. Adjusting the number of breakpoint values $c_k$, for example, by the logarithm calculator 220, means that the distribution of the breakpoint values $c_k$ is adjusted such that they segment the range of the significand differently.

After the number of breakpoint values $c_k$ is adjusted, a breakpoint value $c_k$ from the adjusted plurality of breakpoint values $c_k$ which is the greatest lower bound or the lowest upper bound of the significand may be selected, for example, by the logarithm calculator 220.

For example, assuming N=3 such that the number of breakpoint values $c_k$ is 8 distributed at 1.0000, 1.1250, 1.2500, 1.3750, 1.5000, 1.6250, 1.7500, and 1.8750. Further assuming the value of the significand is 1.3125. In such a case, if configured to select the greatest lower bounding breakpoint value $c_k$, the breakpoint value 1.2500 may be selected, for example, by the logarithm calculator 220. Alternatively, if configured to select the lowest upper bounding breakpoint value $c_k$, the breakpoint value 1.3750 may be selected, for example, by the logarithm calculator 220.

Evidently, the significand is in the middle between the selected greatest lower bounding breakpoint value and the selected lowest upper bounding breakpoint value such that its distance (difference) to these breakpoint values is the same which may degrade accuracy of the resulting logarithm value 204.

The number of breakpoint values $c_k$ may be therefore adjusted, for example, by setting N=4 such that the range of the significand is segmented by 16 breakpoint values $c_k$. In such a case, after adjusting distribution of the breakpoint values $c_k$, the breakpoint value $c_5=1.3125$ from the adjusted plurality of breakpoint values $c_k$ which is the greatest lower bound of 1.3125 may be selected, for example, by the logarithm calculator 220.

As shown at 110, the process continues with obtaining an inverse value $1/c_k$ of the selected breakpoint value $c_k$ and a logarithm value $\log_b(c_k)$ of the selected breakpoint value $c_k$, for example, by the logarithm calculator 220. The base b of the logarithm value $\log_b(c_k)$ of the selected breakpoint value $c_k$ may be selected according to the base b selected for computing the logarithm value $\log_b(x)$ 204 of the received number x 202.

For example, the inverse values $1/c_k$ and the logarithm values $\log_b(c_k)$ of the plurality of breakpoint values $c_k$ may be precomputed and stored in memory, for example, the storage 214. Moreover, the inverse values $1/c_k$ and the logarithm values $\log_b(c_k)$ of the plurality of breakpoint values $c_k$ may be stored in a high-speed memory such as, for example, a cache, a Look Up Table (LUT), and/or the like which is accessible to logarithm calculator 220 with significantly low latency. Moreover, a plurality of logarithm values $\log_b(c_k)$ in a plurality of bases b may be stored in the memory for each of the breakpoint values $c_k$.

According to some embodiments, such memory may be accessed to fetch the inverse value $1/c_k$ and the logarithm values $\log_b(c_k)$ of the selected breakpoint value $c_k$, for example, by the logarithm calculator 220. Fetching these values ($1/c_k$ and $\log_b(c_k)$) of the selected breakpoint value $c_k$ having the same index k and are stored accordingly in the high-speed memory may be significantly fast such that they may be retrieved, for example, by the logarithm calculator 220, in a single access which may significantly reduce latency.

In another example, the inverse values $c_k$ and/or the logarithm values $\log_b(c_k)$ of the selected breakpoint value $c_k$, may be computed in runtime (real-time) according to the base b defined for the requested logarithm value $\log_b(x)$ 204, for example, by the logarithm calculator 220.

As shown at 112, the process continues with computing, for example, by the logarithm calculator 220, a logarithm value $\log_b(m)$ of the significand m of the received number x 202 based on the logarithm value $\log_b(c_k)$ of the selected breakpoint $c_k$ and an approximated logarithm value of an intermediate value derived from a least significant portion of the significand m, which may comprise a number of LSBs of the total bits of the significand m.

One or more methods, functions, and/or algorithms for computing the logarithm value of the intermediate value derived from the least significant portion of the significand m may be applied, for example, by the logarithm calculator 220.

For example, one or more optimization and/or minimization functions to compute and/or minimize an approximation error of a polynomial-based approximation of the logarithm value of the intermediate value derived from the least significant portion of the significand m which may be defined as the difference between the approximated logarithm value and the approximant may be used, for example, by the logarithm calculator 220. For example, one or more minimax polynomial approximation functions may be applied, for example, by the logarithm calculator 220, to compute the approximated logarithm value of the intermediate value derived from the least significant portion of the significand m. The minimax polynomial approximation function may attempt to minimize, over a plurality of possible polynomials, the value of the error function over an approximation interval. Moreover, an attempt to minimize the approximation error of the polynomial-based approximation of the logarithm value while complying with one or more constraints may be made, for example, by the logarithm calculator 220, for example, a maximal accuracy, a reduced utilization of computing resources, a reduced latency (computation time), and/or the like.

As shown at 114, the process continues with computing the logarithm value $\log_b(x)$ of the received number x 202 based on the logarithm value $\log_b(m)$ of the significand m and the exponent e of the received number x 202, for example, by the logarithm calculator 220.

As stated herein before, the processing apparatus 200 may comprise one or more arithmetic circuits which may include one or more unsigned integer arithmetic circuits configured to compute one or more of the logarithm value $\log_b(m)$ of the significand m, the approximated logarithm value of the intermediate value derived from the least significant portion of the significand m, and the logarithm value $\log_b(x)$ of the received number x 202 based on the inverse value $1/c_k$ and the logarithm values $\log_b(c_k)$ of the selected breakpoint value $c_k$ which may be expressed in fixed-point format.

Optionally, as shown at 116, the process may continue with computing, for example, by the logarithm calculator 220, the logarithm value $\log_b(x)$ of the received number x 202 in one or more additional iterations. In each additional iteration, the number of breakpoint values segmenting the range of the significand may be adapted, for example, by the logarithm calculator 220, according to the logarithm value $\log_b(x)$ computed for in a previous iteration.

An additional iteration may be initiated, for example, by the logarithm calculator 220, in case the logarithm value $\log_b(x)$ computed in step 114 fails to comply with one or more constraints and/or criteria. For example, in case the logarithm value $\log_b(x)$ does not meet a certain precision restriction, an additional iteration may be initiated, for example, by the logarithm calculator 220, in attempt to compute a higher precision logarithm value $\log_b(x)$ which may comply and meet the certain precision restriction.

In each additional iteration, the number of breakpoint values $c_k$ may be adjusted, for example, by adjusting the parameter N. An adjusted set of a plurality of adjusted breakpoint values $c_k$ which segments the range of the significand differently from the plurality of breakpoint values $c_k$ used in previous iteration(s) may be obtained, for example, fetched from memory, computed, and/or the like.

Step 108 may then be repeated, for example, by the logarithm calculator 220, to select another breakpoint value $c_k$ from the plurality of adjusted breakpoint values $c_k$ which is the greatest lower bound or the lowest upper bound of the significand m. Steps 110 and 112 may then be repeated, for example, by the logarithm calculator 220, to obtain the inverse value $1/c_k$ and the logarithm value $\log_b(c_k)$ of the selected another breakpoint value $c_k$ and compute the logarithm value $\log_b(m)$ of the significand m accordingly using the obtained values of the another breakpoint value $c_k$.

Step 114 may then be repeated, for example, by the logarithm calculator 220, to compute the logarithm value $\log_b(x)$ of the received number x 202 and round it.

In case the logarithm value $\log_b(x)$ computed based on the adjusted number of breakpoint values $c_k$ still fails to with one or more of the constraints and/or criteria, another iteration may be initiated, for example, by the logarithm calculator 220, and so on until a logarithm value $\log_b(x)$ meets the constraints and/or criteria or a decision to stop iterating is reached, for example, a maximum number of iterations, a maximum computing time, lack of convergence, and/or the like. In such cases the process may proceed to step 118.

As shown at 118, the process may continue with rounding the logarithm value $\log_b(x)$, for example, by the logarithm calculator 220.

One or more rounding schemes, methods, and/or techniques for rounding the logarithm value $\log_b(x)$ may be applied, for example, by the logarithm calculator 220, for example, rounding to nearest-even, rounding down, and/or the like.

The format of the logarithm value $\log_b(x)$, may further be converted, adjusted, and/or adapted, for example, by the logarithm calculator 220. For example, an integer value of the logarithm value $\log_b(x)$ may be extracted to output the logarithm value $\log_b(x)$ 204 in integer form. In another example, the extra bits of the logarithm value $\log_b(x)$ may be truncated, for example, by the logarithm calculator 220, to output the logarithm value $\log_b(x)$ 204 in a fixed-point format, specifically a fixed-point format according to a defined number of bits.

As shown at 120, the correctly rounded logarithm value $\log_b(x)$ 204 of the received number x 202 may be output, for example, by the logarithm calculator 220 via the I/O interface 210.

The output logarithm value $\log_b(x)$ 204 may be used for one or more applications. For example, the logarithm value $\log_b(x)$ 204 may be used for one or more further computations. In another example, the logarithm value $\log_b(x)$ 204 may be stored for future use. For example, the logarithm value $\log_b(x)$ 204 may be presented to one or more users via one or more user interface devices, for example, a screen, and/or the like.

Several implementations may be applied, for example, by the logarithm calculator 220, for computing the logarithm value $\log_b(m)$ of the significand m, as described in step 112 and the logarithm value $\log_b(x)$ 204 as described in step 114.

Figure 4A:
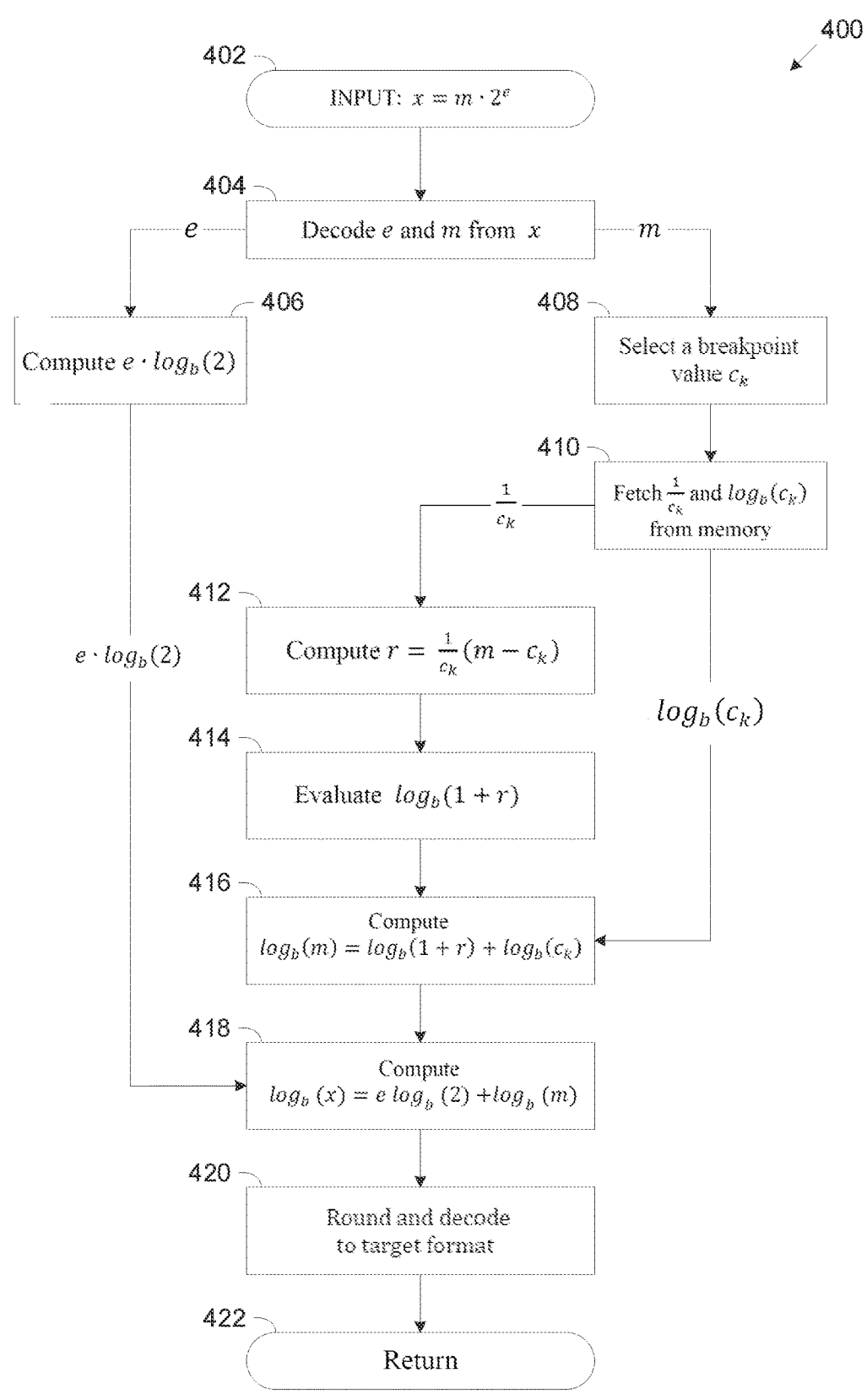
FIG. 4A and FIG. 4B are flowcharts of exemplary embodiments of a process for computing a logarithm of a number, according to some embodiments of the present invention.
Figure 4B:
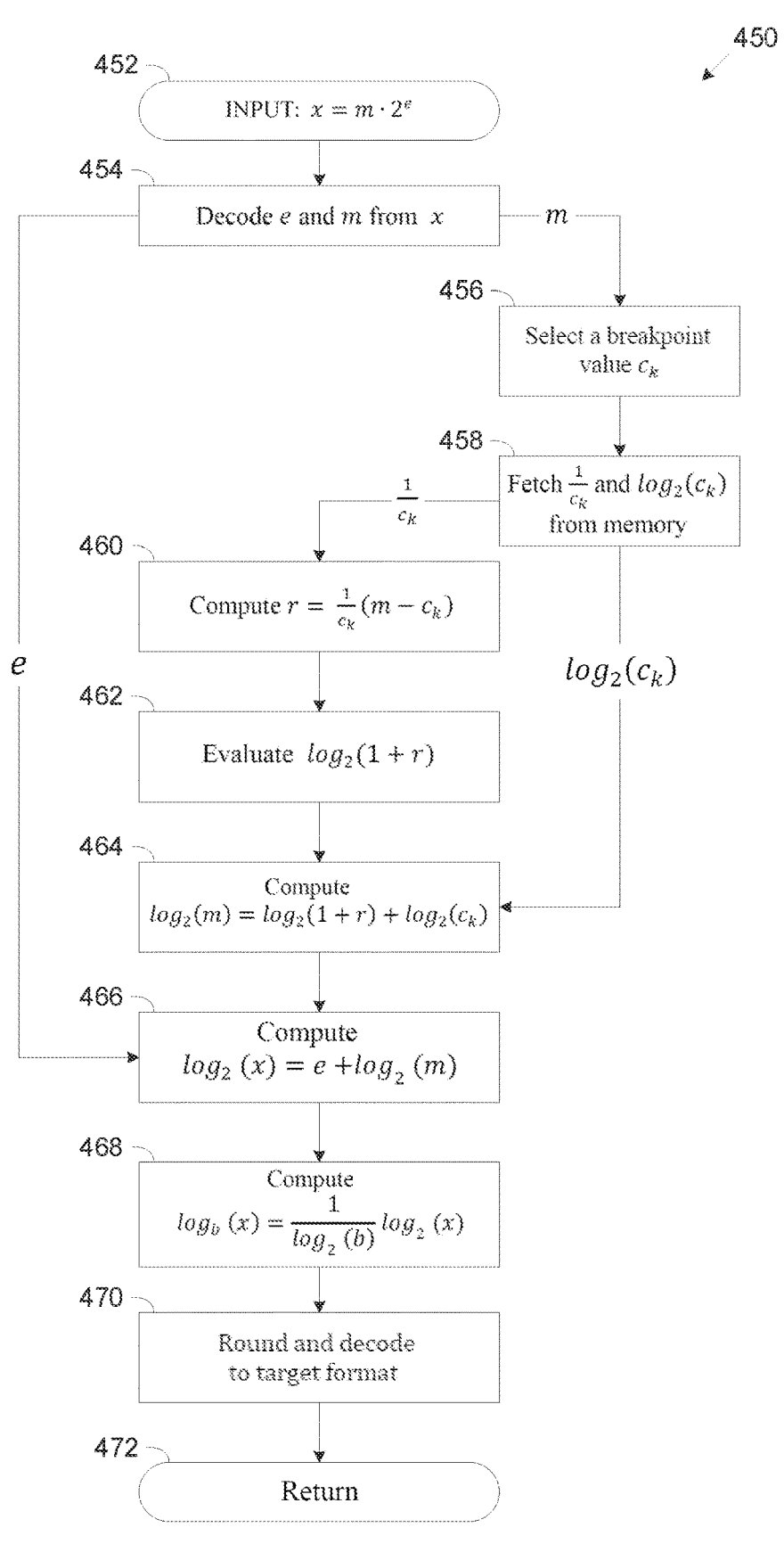

Reference is now made to FIG. 4A and FIG. 4B, which are flowcharts of exemplary embodiments of a process such as the process 100 for computing a logarithm of a number, according to some embodiments of the present invention.

An exemplary process 400, shown in FIG. 4A, describes a first embodiment of a process such as the process 100 which may be executed, for example, by a logarithm calculator such as the logarithm calculator 220 executed by a processing apparatus such as the processing apparatus 200 to compute a logarithm value such as the logarithm value $\log_b(x)$ 204 of a number such as the number x 202.

As described herein above, the process 400 may be executed, for example, by the logarithm calculator 220 which may be implemented through one or more software modules, one or more hardware modules, and/or a combination thereof.

As shown at 402, the process 400 starts with receiving a number x 202, for example, by the logarithm calculator 220, to compute its logarithm value $\log_b(x)$ 204 as described in step 102 of the process 100.

As shown at 404, a significand m, and an exponent e, of the received number x 202 may be decoded and/or computed, for example, by the logarithm calculator 220, as described in step 104 of the process 100.

Moreover, as described in step 104 it may be first determined, for example, by the logarithm calculator 220, whether the received number x 202 is negative or positive and in case it is negative, the logarithm calculator 220 may initiate one or more actions, for example, an exception, an interrupt, a system call, and/or the like indicating that a logarithm value cannot be computed for the received number 202, for example, return an NaN.

The logarithm calculator 220 may further compute and/or determine the sign S of the logarithm value computed for the received number x 202 based on the received number x 202, specifically, the sign S may be positive if the received number x 202 is larger than 1 or it may be negative if the received number x 202 is in the range between 0 and 1.

As shown at 406, a multiplication of the exponent e and a logarithm value of two in the base b defined for the logarithm value $\log_b(x)$ 204 may be computed, for example, by the logarithm calculator 220, according to equation 3 below.

$$e \times \log_b(2) \hspace{3cm} \text{Equation 3}$$

As shown at 408, a breakpoint value $c_k$ may be selected, for example, by the logarithm calculator 220, as described in step 108 of the process 100, specifically, a breakpoint value $c_k$ which is the greatest lower bound of the significand m, or a breakpoint value $c_k$ which is the lowest upper bound of the significand m.

As shown at 410, an inverse value $1/c_k$ and a base b logarithm values $\log_b(c_k)$ of the selected breakpoint value $c_k$ may be obtained, for example, by the logarithm calculator 220, as described in step 110 of the process 100. For example, the logarithm calculator 220 may fetch one or more of these values from memory, for example, the storage 214. In another example, the logarithm calculator 220 may compute in runtime one or more of the inverse value $1/c_k$ and/or the logarithm values $\log_b(c_k)$ of the selected breakpoint value $c_k$.

As shown at 412, a first intermediate value r may be computed, for example, by the logarithm calculator 220, based on the least significant portion of the significand m and the inverse value $1/c_k$ of the selected breakpoint value $c_k$.

The least significant portion of the significand m may be expressed by the difference between the significand m and the selected breakpoint value $c_k$ bounding the significand which may be expressed by $(m-c_k)$. Specifically, the logarithm calculator 220 may compute the first intermediate value according to equation 4 below.

$$r = \frac{1}{c_k}(m - c_k) \qquad \text{Equation 4}$$

It should be noted that the description herein after relates to selecting the breakpoint value $c_k$ which is the greatest lower bound of the significand m. This however should not be construed as limiting since, as may be apparent to a person skilled in the art, similar slightly adjusted formulation may be used for the breakpoint value $c_k$ which is the lowest upper bound of the significand m. Evidently, in case of selecting the lowest upper bound, the difference between the significand m and the selected breakpoint value $c_k$ bounding the significand does not directly express the least significant portion of the significand m but is still indicative of this least significant portion since it is the complementing portion to the least significant portion.

As shown at 414, a base b approximated logarithm value of a second intermediate value derived from the first intermediate value r may be evaluated and/or computed, for example, by the logarithm calculator 220, according to equation 5 below.

$$\log_b(1 + r) \qquad \text{Equation 5}$$

The logarithm calculator 220 may compute the approximated logarithm $\log_b(1+r)$ as described in step 112 of the process 100, for example, using minimax polynomial approximation.

As shown at 416, a logarithm value $\log_b(m)$ of the significand m may be computed, for example, by the logarithm calculator 220, based on the logarithm value $\log_b(c_k)$ of the selected breakpoint $c_k$, which in practice is the logarithm value of the most significant portion of the significand m and the approximated logarithm value $\log_b(1+r)$ of the intermediate value $(1+r)$ derived from the least significant portion of the significand m. For example, the logarithm calculator 220 may compute the logarithm value $\log_b(m)$ by aggregating the logarithm value $\log_b(c_k)$ of the significand m and the approximated logarithm value $\log_b(1+r)$ according to equation 6 below.

$$\log_b(m) = \log_b(c_k) + \log_b(1 + r) \qquad \text{Equation 6}$$

As shown at 418, the logarithm value $\log_b(x)$ of the received number x 202 may be computed, for example, by the logarithm calculator 220, based on the logarithm value $\log_b(m)$ of the significand m and the multiplication $e\times\log_b(2)$ of equation 3 according to equation 7 below.

$$\log_b(x) = e\log_b(2) + \log_b(m) \qquad \text{Equation 7}$$

As shown at 420, the logarithm value $\log_b(x)$ may be rounded, for example, by the logarithm calculator 220, as described in step 118 of the process 100.

As shown at 422, the correctly-rounded logarithm value $\log_b(x)$ of the received number x 202 may be output, for example, by the logarithm calculator 220, as described in step 120 of the process 100.

An exemplary process 450, shown in FIG. 4B, describes another embodiment of a process such as the process 100 which may be executed for example, by the logarithm calculator 220 to compute the logarithm value $\log_b(x)$ 204 of the received number x 202.

As described herein above, the process 450 may be executed, for example, by the logarithm calculator 220 which may be implemented through one or more software modules, one or more hardware modules, and/or a combination thereof.

As shown at 452, the process 450 starts with receiving a number x 202, for example, by the logarithm calculator 220, to compute its logarithm value $\log_b(x)$ 204 as described in step 102 of the process 100.

As shown at 454, a significand m, and an exponent of the received number x 202 may be decoded and/or computed, for example, by the logarithm calculator 220, as described in step 104 of the process 100.

Moreover, as described in step 104 it may be first determined, for example, by the logarithm calculator 220, whether the received number x 202 is negative or positive and in case it is negative, the logarithm calculator 220 may initiate one or more actions, for example, an exception, an interrupt, a system call, and/or the like indicating that a logarithm value cannot be computed for the received number 202, for example, return an NaN.

The logarithm calculator 220 may further compute and/or determine the sign S of the logarithm value computed for the received number x 202 based on the received number x 202, specifically, the sign S may be positive if the received number x 202 is larger than 1 or it may be negative if the received number x 202 is in the range between 0 and 1.

As shown at 456, a breakpoint value $c_k$ may be selected, for example, by the logarithm calculator 220, as described in step 108 of the process 100, specifically, the breakpoint value $c_k$ which is the greatest lower bound of the significand m, or the breakpoint value $c_k$ which is the lowest upper bound of the significand m.

As shown at 458, an inverse value $1/c_k$ and a binary logarithm values $\log_2(c_k)$ of the selected breakpoint value $c_k$ may be obtained, for example, by the logarithm calculator

220, as described in step 110 of the process 100. For example, the logarithm calculator 220 may fetch one or more of these values from memory, for example, the storage 214. In another example, the logarithm calculator 220 may compute in runtime one or more of the inverse value $1/c_k$ and/or the binary logarithm values $\log_2(c_k)$ of the selected breakpoint value $c_k$.

As shown at 460, a first intermediate value r may be computed, for example, by the logarithm calculator 220, based on the least significant portion of the significand m and the inverse value $1/c_k$ of the selected breakpoint value $c_k$, for example, according to equation 4.

As stated in the process 400, the description herein after relates to selecting the breakpoint value $c_k$ which is the greatest lower bound of the significand m. This however should not be construed as limiting since, as may be apparent to a person skilled in the art, similar slightly adjusted formulation may be used for the breakpoint value $c_k$ which is the lowest upper bound of the significand m.

As shown at 462, a binary approximated logarithm value of the second intermediate value (1+r) may be evaluated and/or computed, for example, by the logarithm calculator 220, to produce the approximated logarithm $\log_2(1+r)$ as described in step 112 of the process 100, for example, using minimax polynomial approximation.

As shown at 464, a binary logarithm value $\log_2(m)$ of the significand m may be computed, for example, by the logarithm calculator 220, based on the binary logarithm value $\log_2(c_k)$ of the selected breakpoint $c_k$, which in practice is the binary logarithm value of the most significant portion of the significand m and the approximated binary logarithm value $\log_2(1+r)$ of the intermediate value (1+r) derived from the least significant portion of the significand m. For example, the logarithm calculator 220 may compute the binary logarithm value $\log_2(m)$ by aggregating the binary logarithm value $\log_2(c_k)$ of the selected breakpoint $c_k$, and the approximated binary logarithm value $\log_2(1+r)$ according to equation 8 below.

$$\log_2(m) = \log_2(c_k) + \log_2(1+r) \qquad \text{Equation 8}$$

As shown at 466, the binary logarithm value $\log_2(x)$ of the received number x 202 may be computed, for example, by the logarithm calculator 220, based on the binary logarithm value $\log_2(m)$ of the significand m and the exponent e according to equation 9 below.

$$\log_2(x) = e + \log_2(m) \qquad \text{Equation 9}$$

As shown at 468, the base b logarithm value $\log_b(x)$ of the received number x 202 may be computed, for example, by the logarithm calculator 220, by converting the binary logarithm value $\log_2(x)$ according to equation 10 below, as known in the art.

$$\log_b(x) = \frac{1}{\log_2(b)}\log_2(x) \qquad \text{Equation 9}$$

The binary logarithm value $\log_2(b)$ and/or its inverse value $$\frac{1}{\log_2(b)}$$

may be precomputed for a plurality of bases b (e.g., base 10, natural base, etc.) and stored in memory, for example, the storage 214. Moreover, the binary logarithm values $\log_2(b)$ and/or its inverse value $$\frac{1}{\log_2(b)}$$

may be stored in a high-speed memory such as, for example, a cache, an LUT, and/or the like which is accessible to the logarithm calculator 220 with significantly low latency. Optionally, the logarithm calculator 220 may compute the binary logarithm value $\log_2(b)$ and/or its inverse value $$\frac{1}{\log_2(b)}$$

in runtime.

As shown at 470, the logarithm value $\log_b(x)$ may be rounded, for example, by the logarithm calculator 220, as described in step 118 of the process 100.

As shown at 472, the correctly-rounded logarithm value $\log_b(x)$ of the received number x 202 may be output, for example, by the logarithm calculator 220, as described in step 120 of the process 100.

Figure 5A:
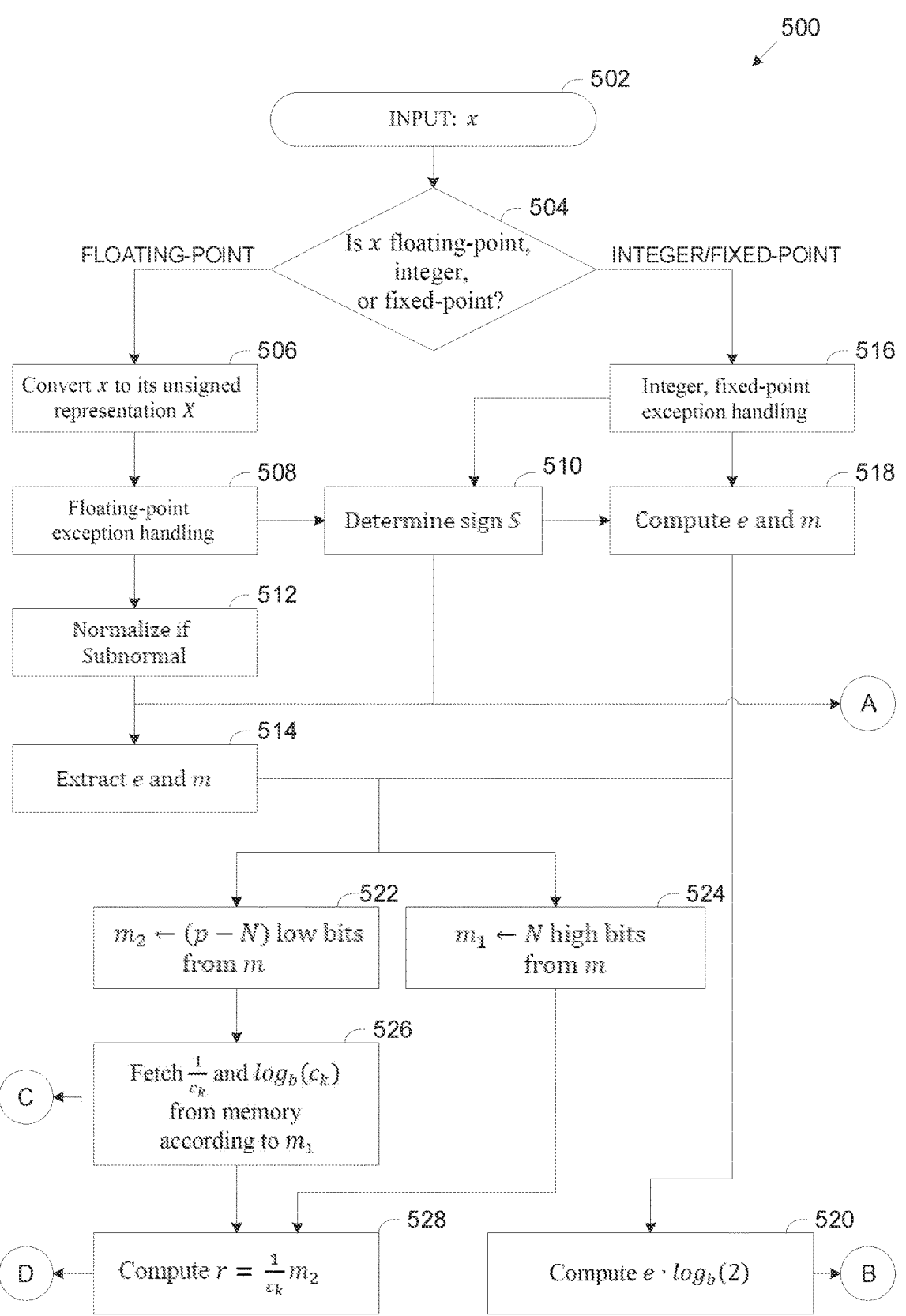
FIG. 5A and FIG. 5B present a flowchart of an exemplary process detailing pre and post steps of a process of computing a logarithm of a number, according to some embodiments of the present invention.
Figure 5B:
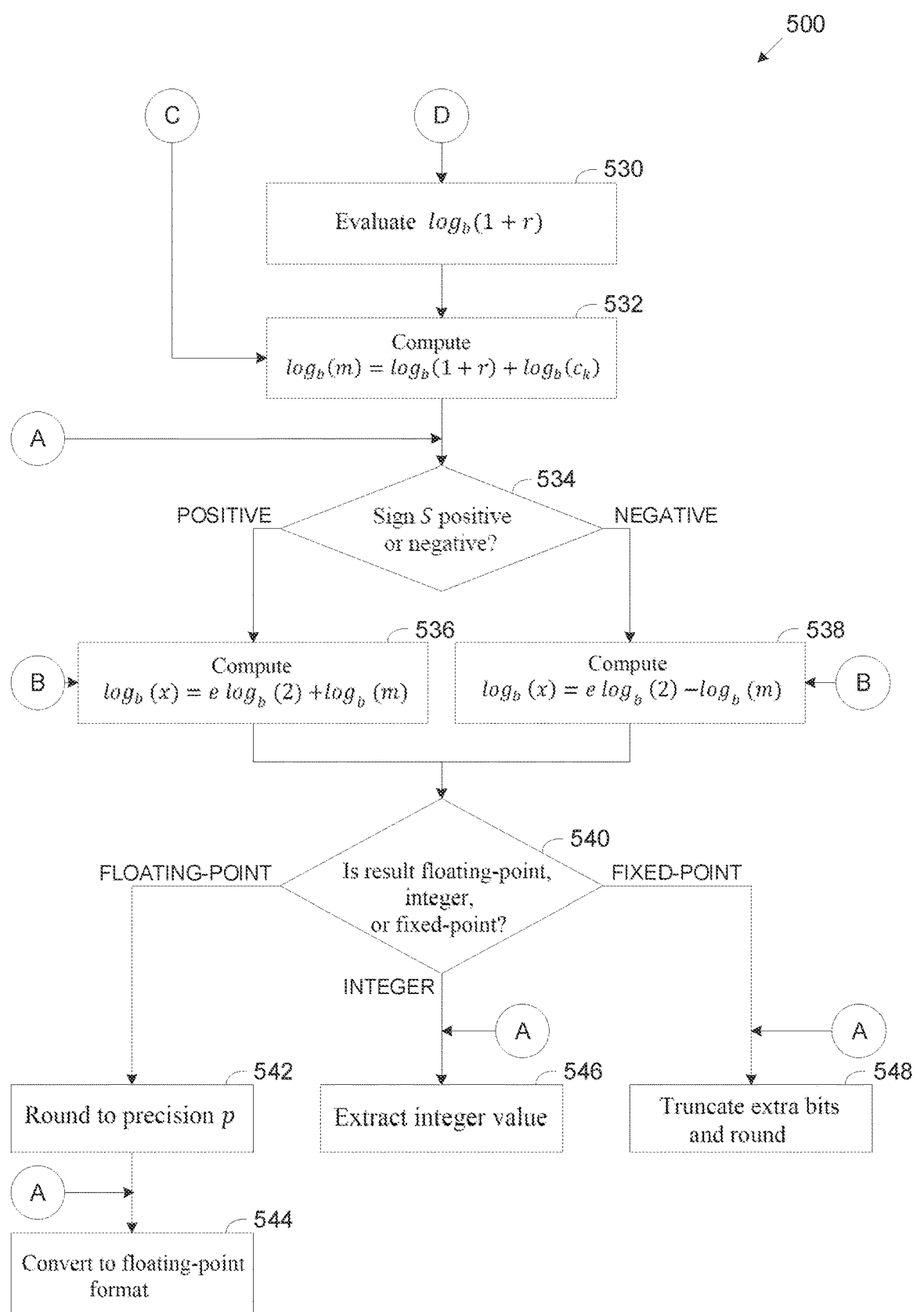

Reference is now made to FIG. 5A and FIG. 5B presenting a flowchart of an exemplary process detailing pre and post steps of a process of computing a logarithm of a number, according to some embodiments of the present invention.

An exemplary process 500 is provided to further detail some of the steps made during the process 100 and its specific embodiments described in the processes 400 and 450 executed by a logarithm calculator such as the logarithm calculator 220 executed by a processing apparatus such as the processing apparatus 200 for computing a base b logarithm value such as the logarithm value $\log_b(x)$ for a received number such as the received number x 202.

In particular, the process 500 aims to further describe some of the pre and post steps performed with respect to the processes 100, specifically with respect to the processes 400, and 450 which are specific embodiments of the process 100.

The process 500 follows the specifics of the process 400. However, as described herein above, the processes 400 and 450 are very similar and slightly differ with respect to the logarithm base used to compute the final logarithm values which is of course similar in both methods, and, as may be apparent to a person skilled in the art, the same logic, computation, methods, algorithms, and techniques and/or the like may be applied in the two processes 400 and 450 only directed to different logarithm bases.

Moreover, the process 500 addresses floating-point, integer and fixed-point numbers. This however, should not be construed as limiting since the process 500 may apply to any number format of the received number x 202 with minor adjustments.

As described herein above, the process 500 may be executed, for example, by the logarithm calculator 220 which may be implemented through one or more software modules, one or more hardware modules, and/or a combination thereof.

As shown at 502, the process 500 starts with receiving the number x 202, for example, by the logarithm calculator 220, as described in step 102 of the process 100.

As shown at 504, which is a conditional step, in case the received number x 202 is in floating-point format, the process 500 may branch to 506, and in case the received number x 202 is in integer format or fixed-point format, the process 500 may branch to 516.

As shown at 506, the floating-point input number x 202 may be converted (bitwise), for example, by the logarithm calculator 220, into its unsigned integer representation X.

As shown at 508, in case the representation X represents a "special" operand such as, for example, a negative number, infinity, ±zero, Not a Number (NaN), one and/or the like, a floating-point exception may be invoked, as known in the art, and the appropriate result may be immediately returned.

Otherwise, as shown at 510, the sign S of the final result (logarithm value of the received number) may be determined, for example, computed, and/or extracted, and stored, for example, by the logarithm calculator 220. In particular, the sign S may be positive if the input number x 202 is larger than 1 and is may be negative in case the input number x 202 is in the range between 0 and 1.

As shown at 512, in case the representation X represents a denormal number, the representation X may be normalized, for example, by the logarithm calculator 220.

As shown at 514, using X and S, the significand m and the exponent e, the unsigned integer representations in a fixed-point format of the significand (without the implicit bit) and the absolute value of the unbiased exponent respectively, may be extracted, for example, by the logarithm calculator 220.

As shown at 516, in case the input number x 202, which is in integer or fixed-point format, is negative or zero and it is desired to compute the logarithm value $\log_b(x)$ in integer or fixed-point formats, a system or language dependent handling routine and/or procedure may be performed, for example, exception handling if supported, a system interrupt, and the like.

Negative signed integer and fixed-point input numbers x 202 may be immediately identified, for example, by the logarithm calculator 220, according to their sign which may be thus extracted. Other methods may be used, as known in the art, to signal negative unsigned integer and fixed-point input numbers x 202. In case the input number x 202 represents 1 (one), then the correct result $\log_b(x)$ is immediately returned, for example, by the logarithm calculator 220.

For an input number x 202 in fixed-point format, the input number x 202 may represent a value in (0, 1). In such a case, the final result should be negative, otherwise, the final result is positive. The sign S of the final result may be stored, for example, by the logarithm calculator 220, as shown at 510. This step is not necessary for input numbers x 202 received in integer format since they cannot represent a value in (0, 1).

As shown at 518, the significand m, and the exponent e may be computed, for example, by the logarithm calculator 220. This may be done differently than the way it is done for a floating-point input number x 202 as described in 514. Moreover, the computing of the significand m and the exponent e of integer and fixed-point input number x 202 may depend on the specific fixed-point representations.

As shown at 520, a multiplication of the exponent e and a logarithm value of two in the base b may be computed as described in step 406 of the process 400.

As shown at 522, a least significant portion m 2 of the significand m comprising (p–N) LSB bits of the significand m may be extracted from the significand m, for example, by the logarithm calculator 220.

As shown at 524, a most significant portion $m_1$ of the significand m comprising N MSB bits of the significand m may be extracted from the significand m, for example, by the logarithm calculator 220.

As shown at 526, one of a plurality of breakpoints such as the breakpoints $c_k$ may be selected, for example, by the logarithm calculator 220, and fetched from a memory such as the storage 214. As described herein above, the selected breakpoint $c_k$ is the greatest lower bound or the lowest upper bound of the significand m. The logarithm calculator 220 may therefore inspect only $m_1$ comprising the N MSBs of the significand m in order to select accordingly the selected breakpoint $c_k$ bounding the significand m from the bottom or from the top.

In particular, the logarithm calculator 220 may fetch and/or otherwise obtain the inverse value $1/c_k$ and the logarithm value $\log_b(c_k)$ of the selected breakpoint $c_k$ as described in step 110 of the process 100.

As shown at 528, a first intermediate value such as the first intermediate value r may be computed, for example, by the logarithm calculator 220, for example, according to equation 4 as described in step 412 of the process 400. Moreover, since the selected breakpoint $c_k$ is selected according to $m_1$, $m_2$ may replace the value $(m-c_k)$ in equation 4.

As shown at 530, a base b approximated logarithm value $\log_b(1+r)$ of a second intermediate value such as the second intermediate value (1+r) derived from the first intermediate value r may be evaluated and/or computed, for example, by the logarithm calculator 220, as described in step 414 of the process 400.

As shown at 532, a logarithm value $\log_b(m)$ of the significand m may be computed, for example, by the logarithm calculator 220, based on the logarithm value $\log_b(c_k)$ of the selected breakpoint $c_k$, which may express the logarithm value of $m_1$, and the approximated logarithm value $\log_b(1+r)$ of the intermediate value derived from $m_2$. For example, the logarithm calculator 220 may compute the logarithm value $\log_b(m)$ according to equation 6 stating $\log_b(m)=\log_b(c_k)+\log_b(1+r)$.

As shown at 534, which is a conditional step, the logarithm value $\log_b(x)$ may be computed, for example, by the logarithm calculator 220, based on the logarithm value $\log_b(m)$ and the exponent according to equation 7. Moreover, the computed logarithm value $\log_b(x)$ may depend on the sign S. In case the sign S is positive the process 500 may branch to 536 and in case the sign S is negative the process 500 may branch to 538.

As shown at 536, since the sign S is positive, the logarithm value $\log_b(x)$ may be computed, for example, by the logarithm calculator 220, according to equation 10 below which duplicates equation 7.

$$\log_b(x) = e\log_b(2) + \log_b(m) \qquad \text{Equation 10}$$

As shown at 538, since the sign S is negative, the logarithm value $\log_b(x)$ may be computed, for example, by the logarithm calculator 220, according to equation 11 below which is another derivation of equation 7.

$$\log_b(x) = e\log_b(2) - \log_b(m) \qquad \text{Equation 11}$$

The logarithm value $\log_b(x)$ computed according to equations 10 or 11 may be expressed in fixed-point format $Q_{i,f}$, where i is the number of integer bits and f is the number of fraction bits.

As shown at 540, which is another conditional step, the logarithm value $\log_b(x)$ may be rounded, for example, by the logarithm calculator 220, according to the format defined and/or requested for the output logarithm value $\log_b(x)$ 204. In case the defined format is floating-point, the process 500 may branch to 542, in case the defined format is integer, the process 500 may branch to 546, and in case the defined format is fixed-point, the process 500 may branch to 548.

As shown at 542, the logarithm value $\log_b(x)$ may be rounded, for example, by the logarithm calculator 220, as described in step 118 of the process 100 and as shown at 544, converted to floating-point format using the sign S to produce the output logarithm value $\log_b(x)$ 204 in floating-point format.

As shown at 546, the logarithm value $\log_b(x)$ may be rounded, for example, by the logarithm calculator 220, as described in step 118 of the process 100 by truncating the f fraction bits from the logarithm value $\log_b(x)$ to produce the output logarithm value $\log_b(x)$ 204 in integer format.

As shown at 548, the logarithm value $\log_b(x)$ may be processed and rounded, for example, by the logarithm calculator 220, as described in step 118 of the process 100 by truncating the certain number of bits according to the specific fixed-point representation defined for the output logarithm value $\log_b(x)$ 204.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms processor architectures and interconnected computation grid are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for efficiently computing correctly-rounded logarithm value in specialized hardware, comprising:

using one or more unsigned integer arithmetic circuits of at least one processor configured for logarithmic computations, said at least one processor configured for:

computing off-line or computing in advance to real-time computation of a logarithm value for a received number, a plurality of pre-computed logarithm values and corresponding inverse values of the pre-computed logarithm values, each for another one of a plurality of breakpoint values;

storing said plurality of pre-computed logarithm values and said corresponding inverse values in a memory device;

wherein said at least one processor comprises one or more interconnected computing grids, wherein each of the one or more interconnected computing grid comprises a plurality of reconfigurable logical elements connected to a plurality of memory units via an interconnected network comprising: a plurality of configurable data routing junctions, a plurality of ingress ports, and a plurality of egress ports;

in run-time:

during each of a plurality of executed computation tasks, analyzing each respective computation task to determine computational requirements and dynamically adjusting a configuration of the one or more interconnected computing grids by:

creating a directed acyclic compute graph having nodes corresponding to logarithmic operations and edges corresponding to data movement between operations, mapping said nodes to said reconfigurable logical elements, and configuring said configurable data routing junctions to connect said nodes according to said edges of said compute graph via said plurality of ingress ports and said plurality of egress ports for an optimized processing configuration, said plurality of executed computation tasks comprising:

receiving, through an I/O interface, a number and computing an exponent and significand of the received number;

selecting a breakpoint value from the plurality of breakpoint values segmenting a range of the significand, the selected breakpoint value is one of: a greatest lower bound, and a lowest upper bound, of the significand;

fetching from said memory device a respective logarithm value of the selected breakpoint value;

computing a multiplication of the exponent and a logarithm value of two;

computing a first intermediate value based on a least significant portion of the significand and an inverse value of the selected breakpoint value;

computing an approximated logarithm value of a second intermediate value derived from the first intermediate value;

computing a logarithm value of the significand by summing the approximated logarithm value and the fetched respective logarithm value of the selected breakpoint value;

computing the logarithm value of the received number by summing the logarithm value of the significand and the multiplication of the exponent and the logarithm value of two; and outputting through said I/O interface, the correctly-rounded logarithm value, wherein storing said pre-computed logarithm values and inverse values in said memory device enables fetching of pre-computed values rather than computing inverse values and logarithm values during execution of the computation tasks.

2. The method of claim 1, wherein the received number is selected from a group consisting of: floating-point, integer, fixed-point, Unum, posit, and logarithmic number system (LNS).

3. The method of claim 1, wherein the at least one processor is configured to compute at least some of the computing steps using at least one arithmetic circuit employing unsigned integer arithmetic.

4. The method of claim 1, wherein said computing the logarithm value of the received number by summing the logarithm value of the significand and the multiplication of the exponent and the logarithm value of two is defined by the formulation:

$$\log_b(x) = e\log_b(2) + \log_b(m)$$

wherein x is the received number, e is the exponent of the number, m is the significand of the received number, and b is a selected base of the logarithm.

5. The method of claim 4, wherein said computing the logarithm value of the significand by summing the approximated logarithm value and a logarithm value of the selected breakpoint value is defined by the formulation:

$$\log_b(m) = \log_b(c_k) + \log_b(1+r)$$

wherein $c_k$ represents the selected breakpoint value, and r is the first intermediate value.

6. The method of claim 5, wherein each of the plurality of breakpoint values $c_k$ is computed according to the formulation:

$$c_k = 1 + \frac{k}{2^N}$$

wherein N is a parameter determining a number of breakpoints, and k is an index of a respective breakpoint, wherein k=(0, 1,2, . . . , 2-1) for selecting a breakpoint value which is the greatest lower bound of the significand, and wherein k=(1,2, . . . , 2) for selecting a breakpoint value which is the lowest upper bound of the significand.

7. The method of claim 5, wherein the first intermediate value is computed according to the formulation:

$$r = \frac{1}{c_k}(m - c_k).$$

8. The method of claim 5, wherein the approximated logarithm value of the second intermediate value is computed according to the formulation:

$$\log_b(1+r).$$

9. The method of claim 1, wherein the inverse value and the logarithm value of the selected breakpoint value are precomputed and fetched from memory.

10. The method of claim 9, wherein at least one of the inverse value and the logarithm value of the selected breakpoint value are stored in the memory in fixed-point format.

11. The method of claim 1, wherein at least one of the inverse value and the logarithm value of the selected breakpoint value are computed in runtime.

12. The method of claim 1, further comprising adjusting a number of the plurality of breakpoint values segmenting the range of the significand according to the value of the received number and selecting the selected breakpoint value accordingly.

13. The method of claim 1, further comprising computing the logarithm value of the received number in at least one additional iteration, wherein each additional iteration comprises:

adjusting a number of breakpoint values segmenting the range of the significand according to the logarithm value computed for the received number in a previous iteration, selecting another breakpoint value based on the adjusted number of breakpoint values, and computing the logarithm value of the received number based on the another selected breakpoint value.

14. The method of claim 1, wherein the at least one processor comprises at least one unsigned integer arithmetic circuit configured to compute, based on the inverse value and the logarithm value of the selected breakpoint value which are expressed in fixed-point format, at least one of the first intermediate value, the approximated logarithm value, the logarithm value of the significand, and the logarithm value of the received number.

15. The method of claim 1, further comprising rounding the logarithm value of the received number according to at least one rounding scheme.

16. The method of claim 1, wherein the approximated logarithm value of the second intermediate value is computed by applying minimax polynomial approximation.

17. The method of claim 1, further comprising:

collecting a plurality of statistical values comprising a plurality of data-statistic values indicative of the computing of the first intermediate value, the approximated logarithm value, the logarithm value of the significand, and/or the logarithm value of the received number, and analyzing the plurality of statistical values to evaluate hardware utilization.

18. A processing apparatus with increased efficiency in computation of correctly-rounded logarithm value in specialized hardware, comprising:

an input interface configured to receive a number;

at least one processor which comprises one or more interconnected computing grids, wherein each of the one or more interconnected computing grid comprises a plurality of reconfigurable logical elements connected to a plurality of memory units via an interconnected network comprising: a plurality of configurable data routing junctions, a plurality of ingress ports, and a plurality of egress ports;

one or more unsigned integer arithmetic circuits of the at least one processor configured to:

compute off-line or compute in advance to real-time computation of a logarithm value for the received number, a plurality of pre-computed logarithm values and corresponding inverse values of the pre-computed logarithm values, each for another one of a plurality of breakpoint values;

store said plurality of pre-computed logarithm values and said corresponding inverse values in a memory device;

in run-time:

during each of a plurality of executed computation tasks, analyze each respective computation task to determine computational requirements and dynamically adjust a configuration of the one or more interconnected computing grids by:

creating a directed acyclic compute graph having nodes corresponding to logarithmic operations and edges corresponding to data movement between operations, mapping said nodes to said reconfigurable logical elements, and configuring said configurable data routing junctions to connect said nodes according to said edges of said compute graph via said plurality of ingress ports and said plurality of egress ports for an optimized processing configuration, said plurality of executed computation tasks comprising:

compute an exponent and significand of the received number;

select a breakpoint value from the plurality of breakpoint values segmenting a range of the significand, the selected breakpoint value is one of: a greatest lower bound, and a lowest upper bound, of the significand;

fetch from said memory device a respective logarithm value of the selected breakpoint value;

compute a multiplication of the exponent and a logarithm value of two;

compute a first intermediate value based on a least significant portion of the significand and an inverse value of the selected breakpoint value;

compute an approximated logarithm value of a second intermediate value derived from the first intermediate value;

compute a logarithm value of the significand by summing the approximated logarithm value and the fetched respective logarithm value of the selected breakpoint value;

compute the logarithm value of the received number by summing the logarithm value of the significand and the multiplication of the exponent and the logarithm value of two; and an output interface configured to output the correctly-rounded logarithm value computed for the received number wherein storing said pre-computed logarithm values and inverse values in said memory device enables fetching of pre-computed values rather than computing inverse values and logarithm values during execution of the computation tasks, thereby reducing hardware resource utilization and power consumption.

19. A method for efficiently computing correctly-rounded logarithm value in specialized hardware, comprising:

using one or more unsigned integer arithmetic circuits of at least one processor configured for:

computing off-line or computing in advance to real-time computation of a logarithm value for a received number, a plurality of pre-computed binary logarithm values and corresponding inverse values of the pre-computed binary logarithm values, each for another one of a plurality of breakpoint values;

storing said plurality of pre-computed binary logarithm values and said corresponding inverse values in a memory device;

wherein said at least one processor comprises one or more interconnected computing grids, wherein each of the one or more interconnected computing grid comprises a plurality of reconfigurable logical elements connected to a plurality of memory units via an interconnected network comprising: a plurality of configurable data routing junctions, a plurality of ingress ports, and a plurality of egress ports;

in run-time:

during each of a plurality of executed computation tasks, analyzing each respective computation task to determine computational requirements and dynamically adjusting a configuration of the one or more interconnected computing grids by:

creating a directed acyclic compute graph having nodes corresponding to logarithmic operations and edges corresponding to data movement between operations, mapping said nodes to said reconfigurable logical elements, and configuring said configurable data routing junctions to connect said nodes according to said edges of said compute graph via said plurality of ingress ports and said plurality of egress ports for an optimized processing configuration, said plurality of executed computation tasks comprising:

receiving, through an I/O interface, a number and computing, by said logarithm calculator, an exponent and significand of the received number;

selecting a breakpoint value from the plurality of breakpoint values segmenting a range of the significand, the selected breakpoint value is one of: a greatest lower bound, and a lowest upper bound, of the significand;

fetching from said memory device a respective binary logarithm value of the selected breakpoint value;

computing a first intermediate value based on a least significant portion of the significand and an inverse value of the selected breakpoint value;

computing an approximated binary logarithm value of a second intermediate value derived from the first intermediate value;

computing a binary logarithm value of the significand by summing the approximated binary logarithm value and the fetched respective binary logarithm value of the selected breakpoint value;

computing a binary logarithm value of the received number by summing the binary logarithm value of the significand and the exponent;

computing a base b logarithm value of the received number by dividing the binary logarithm value of the received number by a binary logarithm value of b; and outputting, through said I/O interface, the correctly-rounded logarithm value, wherein storing said pre-computed logarithm values and inverse values in said memory device enables fetching of pre-computed values rather than computing inverse values and logarithm values during execution of the computation tasks, thereby reducing hardware resource utilization and power consumption.

* * * * *